April 16, 1929.    J. R. GAMMETER    1,709,209

REENFORCED ENDLESS BELT AND METHOD OF MAKING THE SAME

Original Filed April 9, 1921

Inventor
John R. Gammeter
By Pierson, Eakin & Avery,
Attys.

Patented Apr. 16, 1929.

1,709,209

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

REENFORCED ENDLESS BELT AND METHOD OF MAKING THE SAME.

Original application filed April 9, 1921, Serial No. 460,048. Divided and this application filed October 18, 1926. Serial No. 142,368.

This invention relates to endless transmission belts of the side-driving type composed of fibrous material and a moldable or vulcanizable material such as rubber, and to methods of manufacturing the same.

In the parent application, Serial No. 460,048, filed April 9, 1921, now Patent Number 1,610,942, of which this application is a division, are described belts adapted to be made of strong and durable construction, substantially uniform in cross-section, size, shape and structure, and accurately limited as to circumferential stretchability, and certain methods of manufacturing belts of the materials above mentioned, whereby the operation may be rapid and accurate without requiring great skill upon the part of the workman.

The present invention relates more particularly to such belts when provided with a fibrous reenforcing core and a belt body of rubberized fabric directly or immediately enclosing said core without an intervening substantial cushion or filler of rubber, said belt body being a band structure of rubberized fabric transversely wrapped or rolled around the core in a plurality of plies.

My particular objects herein are to provide a belt of thoroughly compact structure and minimum stretchability in service, of comparatively small compressibility in a transverse direction, but of high flexibility and long life, and also to provide a fast and economical method of making the belt in which the desired qualities thereof are largely imparted by laying up and rolling together components of a certain character.

Of the accompanying drawings, Fig. 1 is a side elevation of a mandrel adapted for the practice of my invention, with a belt core and a cover or body strip thereon.

Figure 4:
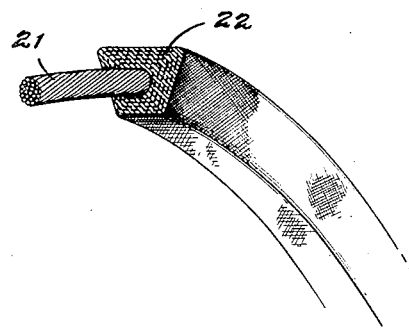
Fig. 4 is a perspective view showing a part of the belt with a core of thread or cord fabric.

In the drawings, 10 is a mandrel with a frusto-conical upper portion 11 and a cylindrical lower portion 11ᵃ. 21 is an annular cord core, which may be of any ordinary construction but preferably is made of weakwefted thread fabric or of weftless thread or cord fabric. The conical portion 11 of the mandrel is adapted to stretch the core as the latter is rolled down over it onto the cylindrical portion 11ᵃ of the mandrel. 15 is a band of rubberized fabric, such as ordinary square-woven duck, preferably bias cut as shown, encircling the cylindrical portion of the mandrel and joined by a diagonal or oblique seam 16, said band in Fig. 2 being partly rolled upon itself, as shown at 17. Referring to Fig. 4, 21 is the rolled belt core of thread or cord fabric as it appears in the belt structure and 22 is the main body of the belt, which may be made of any suitable fabric, such as the square-woven, biascut fabric of the cover band 15.

In practicing my invention, to produce the belt shown in Fig. 4, I take a strip of rubberized fabric 15 of approximately the length of the belt to be made and cut the ends diagonally in the same direction, giving the strip the form of a parallelogram. This strip is then placed in the form of a tube or annulus upon the cylindrical part of the mandrel, Fig. 1, with its rubber-coated side out, and its ends joined in a diagonal lap or butt seam as shown at 16, Figs. 1 and 2. The endless core 21, of appropriate length, which, as above stated, may be of any usual construction, is then rolled down over the conical part of the mandrel, being somewhat stretched in this operation due to the conical form of the mandrel, and directly or immediately onto the band of tacky, rubberized fabric 15, without any intervening filler or cushion other than the thin coating of rubber upon the fabric of the band and core. The band of fabric, due to its sticky outer surface, adheres to the core and is rolled with it, forming a covering of one or more plies of fabric according to the width of the band of fabric as placed upon the mandrel.

The result is an annular structure of approximately circular cross-section, comprising the inner core of cord 21 and the outer covering of rubberized fabric 15. This structure is then placed in an annular mold having the cross-sectional form desired in the finished belt and vulcanized under lateral compression, being thereby caused to assume the cross-sectional form desired, the V-type of belt being used for illustration in Fig. 4. The mold may, if desired be constructed in any well known or suitable manner so as to expand and stretch the belt as it is forced into the latter.

Figure 1:
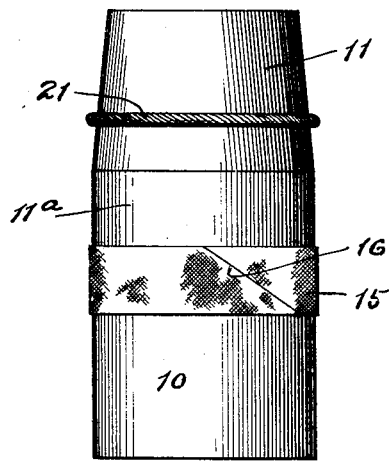
Figure 2:
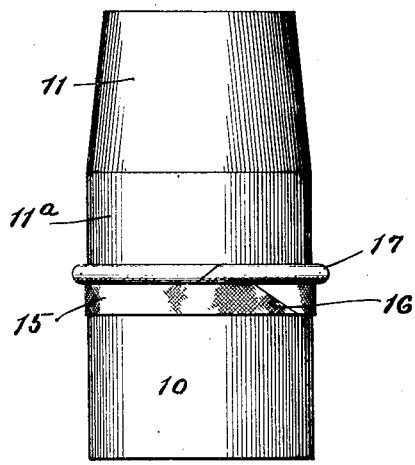
Fig. 2 is a similar view showing a later step.

It will be observed that when the rolling of the material is performed upon a cylindrical part of a mandrel, as above described and as shown in Figs. 1 and 2, there is a progressive stretching of the core as successive plies of rubberized fabric come between the core and the mandrel. This, together with the initial stretching of the core by rolling it upon the frusto-conical portion of the mandrel, results in stretching the core by a pre-determined amount, and the core is thereafter held in that stretched condition by the rubberized cover applied to it, so that a comparatively small amount of stretching or none at all is required in the vulcanizing mold, depending upon whether a substantially inextensible or a slightly resilient belt is desired, and after vulcanization the rubber in the belt permanently secures it in its final condition.

The rolling of the cover or body fabric directly against the core under the conditions mentioned not only effectively stretches and compacts the core, but also, by reason of the reaction of the body fabric between plies and against the tensioned core during the rolling operation, the components are so firmly united and compacted together as to suppress or exclude the presence of air or gases which, during vulcanization, might tend to produce air pockets and defective adhesion leading to premature failure of the belt in service. The imposition of any further stretch during manufacture, as by forcing the belt into the vulcanizing mold or while in said mold, or otherwise, serves to bring it to a proper length for vulcanization, to reduce and compact the belt in cross-section due in part to the constrictive action of rolled bias fabric when pulled lengthwise, and to further limit the stretchability of the vulcanized belt in service.

Bands of different material may be placed side by side upon the same mandrel before the rolling is begun and each of them picked up in succession by a single rolling operation.

Figure 3:
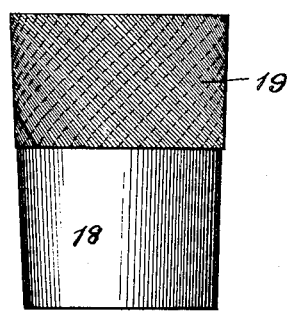
Fig. 3 is a side elevation of a tapered mandrel with a band of weak-wefted fabric thereon, adapted to be rolled from the larger toward the smaller end of the mandrel.

In the modification of my invention shown in Fig. 3, 18 is a frusto-conical mandrel, inverted or tapered downwardly to permit the fabric to be rolled downward upon itself without substantial stretching of the inner plies of the fabric. The section being progressively smaller downward compensates for the increasing thickness of the roll as it moves downward upon the mandrel. 19 is a band of bias-cut, weak-wefted thread fabric mounted thereon. This band of fabric is rolled upon itself, either with or without stretching, according to the shape of the mandrel, forming an annular structure of rubberized fabric. I may roll one piece of fabric to produce a core such as 21 and thereafter place upon it a body of fabric by the process above described. In that case, the mandrel preferably is formed with a conical top, as in Figs. 1 and 2, to facilitate bringing the core into position for rolling with the cover and, if desired, to stretch it before applying the latter thereto.

While the fabric in the ring or grommet forming the core 21 may be of any suitable character, I prefer to make it as shown, of so-called thread or cord fabric in which the warp threads are held together by rubber and in some instances also by occasional weak weft threads, the threads or cords in any case being on the bias. Hence the strength-giving cords lie in a helical position and will the more readily adjust themselves to each other and, when the core is stretched or pulled longitudinally as by rolling it over a conical surface or rolling it in a cover over a cylindrical surface as described, will exert a constricting force upon each other to anchor the ends thereof at the splice. This form of core may be economically made, a spliced annulus being produced by the method described without the tedious operation of weaving the ends of individual threads through the structure as in the case of splicing a cable, and yet the thread ends lie at different points circumferentially of the core and the end portions of the successive convolutions of fabric are suitably gripped between the adjacent convolutions when the structure is put under tension.

The cord core 21 gives the belt great strength, and the fabric cover 15 of Figs. 1 and 2 or 19 of Fig. 3, or the body or cover 22 of Fig. 4 resists surface wear and preserves the form of the belt. The fabric cover being composed of a single piece of fabric wound in a plurality of plies, strengthens the belt, retains its form, and holds the core in its stretched condition. As the cover band is formed with an oblique seam, the seam is not superposed upon itself in successive plies but passes helically along the belt as clearly shown in Fig. 2, thus avoiding the concentration of any weakness or thickening effect incident to the seam. The cover being bias cut gives it greater elasticity in the directions in which it is required to be stretched or compressed, whereby it conforms readily to the desired shape. It will be understood that the invention is not wholly limited to the making of the belt body of a single piece of fabric.

The final product shown in Fig. 4 is distinguished by the absence of any substantial cushion or filler of rubber between the core and the body fabric. This limits the compressibility of the belt in a transverse direction and avoids too tight a wedging of the belt between the sides of the V-grooved pulleys which would tend to produce undue wear upon the belt and give the effect of a lengthening thereof requiring readjustment of the distance between pulley centers.

Further modifications may be resorted to without departing from my invention, and I do not limit my claims wholly to the specific structures and procedures shown and described.

I claim:

1. An endless transmission belt of the side-driving type comprising an annular reenforcing core, and a belt body composed of a band of rubberized, bias fabric directly enclosing said core in a plurality of continuous convolutions.

2. An endless, vulcanized, transmission belt, substantially V-shaped in section, comprising a substantially inextensible, annular, fibrous core, and a belt body composed of a band of rubberized, bias fabric immediately enclosing said core in a plurality of continuous convolutions.

3. An endless, vulcanized, transmission belt of the side-driving type comprising a substantially inextensible, annular, fibrous core of substantially circular section, and a belt body composed of a band of rubberized, bias fabric directly enclosing said core in a plurality of continuous convolutions.

4. An endless, vulcanized, transmission belt of the side-driving type comprising a substantially inextensible, annular, fibrous core, and a belt body of rubberized fabric transversely wrapped around said core in successive convolutions forming a plurality of plies, the innermost ply being immediately in contact with said core and the outermost ply being composed of square-woven, bias fabric constituting the driving surface of the belt.

5. A process of endless belt making which consists in forming a tube of rubberized fabric, placing directly thereon a circumferential, fibrous reenforcement, and rolling said fabric transversely around said reenforcement.

6. A process of endless belt making which consists in forming a tubular band of bias, rubberized fabric, placing a circumferential, fibrous, core-forming reenforcement directly thereon, rolling said fabric transversely around said reenforcement, elongating the belt to reduce the stretchability of the core and contract the fabric upon the core, and vulcanizing the belt.

7. A process of endless belt making which consists in forming a tubular band of bias, rubberized fabric, placing directly thereon, circumferentially, a fibrous reenforcement, and rolling said fabric transversely around said reenforcement while maintaining the reenforcement under tension.

8. A process of belt making which consists in laying annularly upon a mandrel a band of rubberized cover fabric, placing reenforcing core material circumferentially, directly thereon, rolling said fabric transversely around the core, along the mandrel and stretching the core by the process of rolling, then stretching the belt as a whole and vulcanizing it.

9. A process according to claim 8 in which the band of cover fabric has bias threads and is contracted upon the core by the final stretching of the belt.

In witness whereof I have hereunto set my hand this 16th day of October, 1926.

JOHN R. GAMMETER.